United States Patent [19]
Jahns et al.

[11] Patent Number: 5,626,986
[45] Date of Patent: May 6, 1997

[54] CARBON COATING FOR AN ELECTRODE

[75] Inventors: Carl D. Jahns, Franklin; Peter J. Lex, Wauwatosa; Ralph A. Petersen, West Allis, all of Wis.

[73] Assignee: ZBB Technologies, Inc., Wauwatosa, Wis.

[21] Appl. No.: 542,288

[22] Filed: Oct. 12, 1995

[51] Int. Cl.⁶ .................................................. H01M 4/62
[52] U.S. Cl. ...................... 429/210; 423/445 R; 423/449.1
[58] Field of Search ........................... 429/105, 210; 423/445, 449.1

[56] References Cited

U.S. PATENT DOCUMENTS

| | | | |
|---|---|---|---|
| 4,061,719 | 12/1977 | Schallus et al. | 423/449.1 X |
| 4,082,694 | 4/1978 | Wennerberg et al. | 423/445 X |
| 4,098,967 | 7/1978 | Biddick et al. | 429/210 |
| 4,740,434 | 4/1988 | Hirota et al. | 429/105 |
| 4,945,019 | 7/1990 | Bowen et al. | 429/72 |
| 5,082,594 | 1/1992 | Tsuzuki et al. | 429/210 X |
| 5,173,362 | 12/1992 | Tekkanat et al. | 429/210 X |
| 5,308,718 | 5/1994 | Eidler et al. | 429/152 |
| 5,393,821 | 2/1995 | Shieh et al. | 423/449.1 X |

*Primary Examiner*—S. J. Kalafut
*Attorney, Agent, or Firm*—Godfrey & Kahn, S.C.

[57] ABSTRACT

A carbon coating including carbon particles having a predetermined size and BET surface area. The carbon coating is applied to electrodes used in batteries. The electrodes may include a nonconductive frame defining at least one aperture and at least one carbon plastic sheet which is borne by the frame and disposed in occluding relation relative to the aperture. The carbon coating is applied to one surface of the carbon plastic sheet.

11 Claims, 3 Drawing Sheets

CARBON COATING FOR AN ELECTRODE

BACKGROUND OF THE INVENTION

1. Field of the Invention

The present invention relates to a carbon coated plastic electrode for use in batteries. More particularly, the present invention relates to a coating which may be applied to a carbon plastic electrode and which provides a high electrochemical surface area.

2. Description of the Prior Art

Electrodes are key components in batteries. As will be understood, certain types of batteries, employ carbon plastic electrodes. Accordingly, it has long been known that an improved carbon plastic electrode would result in improved battery performance.

In this regard, batteries of the prior art typically include a stack of cells, and an electrolyte, or liquid containing positive and negative ions, that facilitates the flow of electricity therethrough. Each battery cell includes an electrode upon which an anodic reaction occurs, and an electrode upon which a cathodic reaction occurs. As a result of these separate reactions, energy is either stored or released. In batteries which are known as monopolar batteries, each electrode functions as a single pole, so that an anode and a cathode are required to form an individual cell. Further, an ion-permeable barrier, or separator, separates the anode from the cathode. In these monopolar batteries, the cells forming the stack are hydraulically isolated from each other and electrically coupled in series by an external electrical conductor. As should be understood, electrons leave the cathode, travel ionically through the electrolyte and separator, and are deposited on the anode. The electrons then leave the body of the battery, travelling electronically through the electrical conduit to the cathode of the adjacent cell.

In bipolar flow batteries, each electrode includes two poles, that is, an anodic reaction occurs on one side of the electrode and a cathodic reaction occurs on the opposite side of the same electrode. Each cell of a bipolar flow battery is electronically coupled in series and hydraulically coupled in parallel to an adjacent cell. In this arrangement, electrons travel ionically through the electrolyte and through an ion-permeable separator. Further, the electrons flow electronically between adjacent cells and through the bipolar electrode, which is common to both the anodic and cathodic half cells. Thus, in this type of battery, electron flow is entirely internal. In contrast, electricity leaves the interior of a monopolar battery as it travels through the external electrical conduit. As should be understood, the electrical conduit is a relatively high electrical resistance path. As a result, bipolar batteries generally possess a higher current density than monopolar batteries because electrons in bipolar batteries do not have to travel along the relatively high resistance, external path.

Accordingly, bipolar batteries and, in particular, bipolar, zinc-bromine batteries, have proven to be superior to other types of battery design for applications where high current and energy density are required.

Zinc-bromine batteries have an aqueous solution of zinc-bromide and quaternary ammonium salts, for example, methylethylpyrrolidinium bromide, with optional supporting salts, such as $NH_4Cl$, which is circulated through the individual cells from an external reservoir. Each cell has two portions, one half of the cell contains an anolyte and the other half of the cell contains a catholyte. The anolyte flows through a common anolyte manifold to each anodic half cell and the catholyte flows through a parallel common catholyte manifold. The alternating separators and electrodes are sealed together in a manner which prevents communication between the anolyte and catholyte systems.

In the discharged state, the anolyte is substantially chemically identical to the catholyte. During the process of collecting a charge, the following chemical reaction takes place:

$$Zn^{++}+2e^- \rightarrow Zn$$

$$2Br^- \rightarrow Br_2+2e^-$$

Zinc is plated on the anode, and bromine is produced at the cathode. The bromine is immediately complexed by the quaternary ammonium ions in the electrolyte to form a dense second phase which is subsequently removed from the battery stack with the flowing electrolyte. Further, when the battery is charged, zinc is stored on one side of each electrode and the complex bromine is stored in the catholyte reservoir.

During the electrical discharge process, the following chemical reaction takes place.

$$Br_2+2e^- \rightarrow 2Br^-$$

$$Zn \rightarrow Zn^{++}+2.$$

In this reaction, zinc is oxidized, and the released electrons pass through the bipolar electrode where they combine with molecular bromine to form bromide ions. The positively charged zinc ions travel through the separator and remain in solution, and at the same time, bromide ions pass through the separator in the opposite direction and remain in solution.

As will be recognized following a study of the description above, the electrodes are key elements in batteries because it is upon their respective surfaces that critical electrochemical reactions take place. Electrodes for use in a bipolar battery may be formed from extruded, carbon-filled, high-density polyethylene or carbon plastic. Sheets of carbon plastic may be affixed by molding or other similar techniques in plastic frames. Such a frame may then be thermally welded to other components to form a battery as is described more fully in U.S. Pat. No. 4,945,019 and U.S. Pat. No. 5,308,718, the disclosures of which are incorporated by reference herein.

Of some importance in a bipolar battery design which employs a plastic-component construction is the rate at which the bromine-bromide reaction takes place. When compared to the zinc-plating reaction, the bromine-bromide reaction on a carbon plastic electrode is relatively slow.

It has been found that the rate of the bromine-bromide reaction may be increased by coating the surface area of the electrode on which the reaction takes place. In particular, it has been found that certain coatings have improved the efficiency and cycle life for zinc-bromine batteries.

For example, high surface area carbon coatings applied to carbon plastic electrodes have been associated with improved efficiencies and were expected to yield a very high electrochemical surface area and, therefore, increase the rate of the bromine-bromide reaction. However, this has not always been the case.

Accordingly, it would be desirable to have an improved electrode for use in a bipolar battery wherein a bromine-bromide reaction could occur at a relatively faster rate. It would also be desirable to have a coating, which when applied to an electrode, produces a high electrochemical surface area, when compared to the prior-art techniques. It would also be desirable to have an improved electrode which improves the efficiency and cycle life of a bipolar battery which incorporates same.

OBJECTS AND SUMMARY OF THE INVENTION

Therefore it is an object of the present invention to provide an improved electrode for use in a battery.

A further object of the present invention is to provide an improved coating for an electrode and which improves the efficiency and cycle life of a battery using same.

A further object of the present invention is to provide an improved coating for an electrode and which, when applied to the electrode, provides a very high electrochemical surface area.

A further object of the present invention is to provide an improved coating for an electrode for use in a zinc-bromine battery where the coating increases the rate of the bromine-bromide reaction occurring within the battery.

These and other objects and advantages are achieved in an electrode of the present invention which includes a substrate of electrically conductive material formed of a plastic material containing electrically conductive particles. The substrate of electrically conductive material has a first surface and an opposite second surface. A carbon coating is applied to the first surface of the substrate.

The substrate of electrically conductive material may be a sheet or sheets of electrically conductive carbon plastic. The carbon plastic sheets may be mounted in a plastic frame having first and second openings which are defined by individual peripheral edges, wherein a first sheet of carbon-plastic, and a second sheet of carbon plastic, are individually affixed on the peripheral edges of the first and second openings. Embedded within the carbon-filled sheets may be an optional metal screen.

One side of the electrode is smooth in order to facilitate the electroplating of zinc. This side of the electrode may be covered by a polyethylene or polypropylene screen or mesh. The screen is mounted on the frame along the peripheral edges of the openings in the frame after the carbon plastic sheets have been mounted therein. The other side of the electrode has a carbon coating applied thereto in order to increase the rate of the bromine-bromide reaction which was described earlier.

The carbon coating includes carbon particles of different sizes. In particular, the carbon coating, which is applied to an electrode and which is made in accordance with the teachings of the present invention includes particles having a surface area of greater than about 700 m²/g, as measured using a nitrogen intrusion method known in the art as "BET" and a mean size of greater than about 30 microns. In addition, the carbon coating of the present invention has a distribution of particles such that 90 percent, by volume, of the particles are greater than about 10 microns in size. It has also been found that the coating of the present invention is even more advantageous when the particles in the coating have a BET surface area of greater than about 1000 m²/g; the mean particle size of the particles is greater than about 50 microns; and the carbon particles are distributed in the carbon coating so that about 90 percent, by volume, of the particles are greater than about 20 microns in size.

These and other objects and advantages of the present invention will become more apparent from the following detailed description of the preferred embodiment of the present invention taken in combination with the accompanying drawings.

DESCRIPTION OF THE EMBODIMENT

Figure 1:
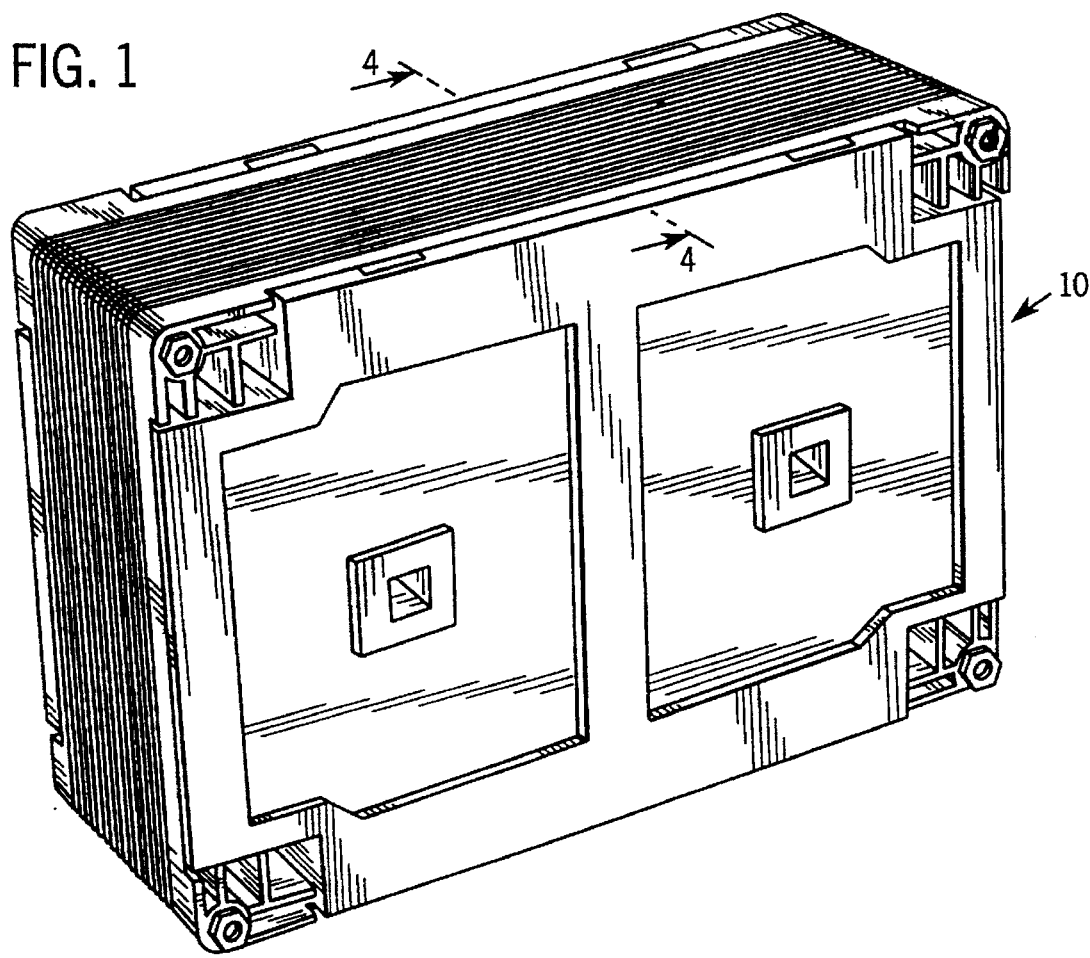
FIG. 1 is a perspective, environmental side elevation view of a battery employing electrodes constructed in accordance with the teachings of the present invention.
Figure 2:
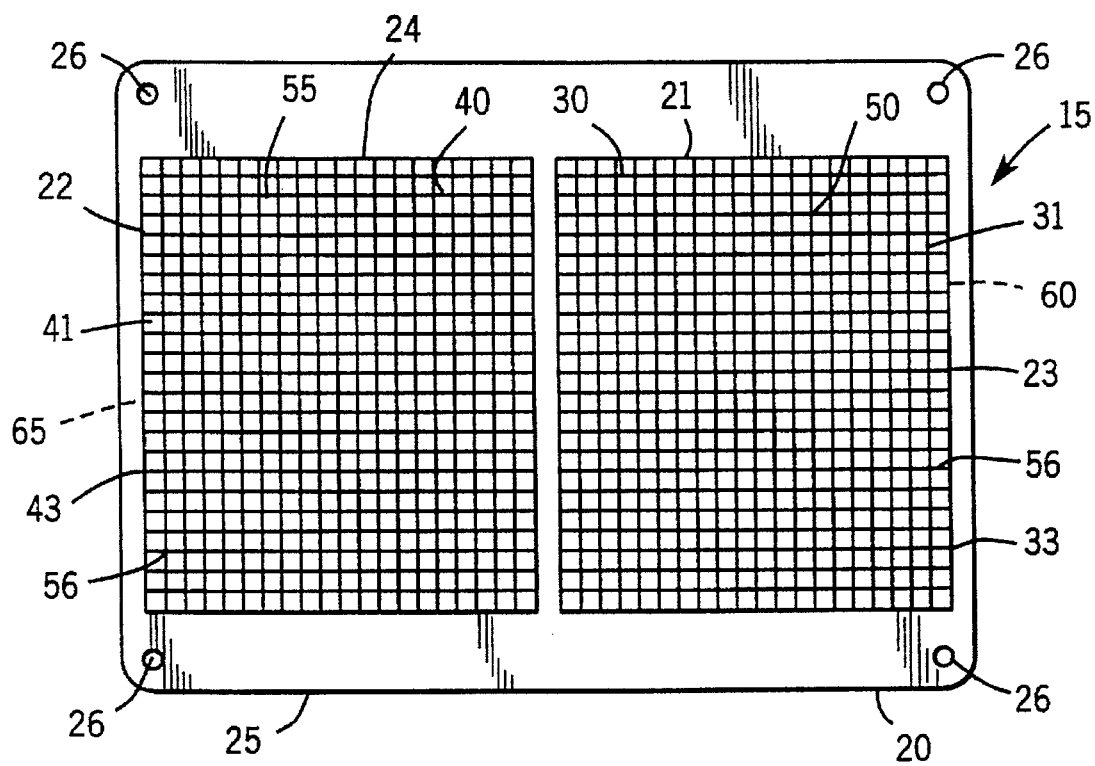
FIG. 2 is a side elevation view of an electrode constructed in accordance with the teachings of the present invention.
Figure 3:
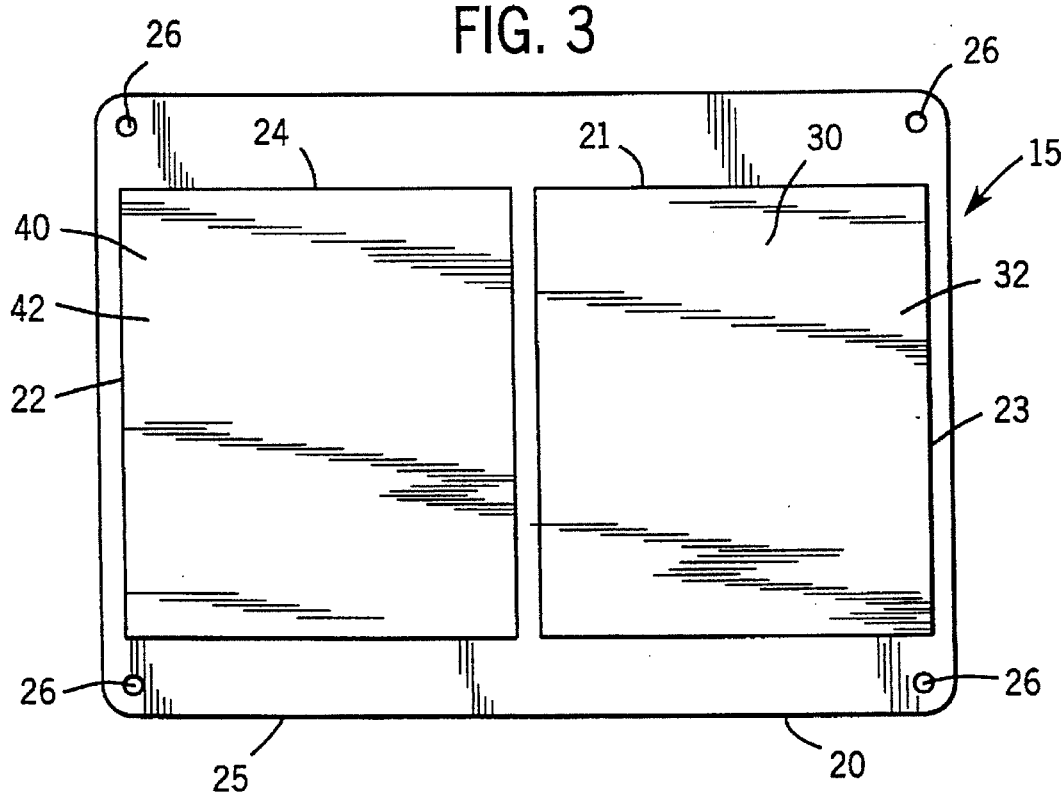
FIG. 3 is a side elevation view of an electrode constructed in accordance with the teachings of the present invention.

Referring more particularly to the drawings, a battery employing electrodes constructed in accordance with the teachings of the present invention is designated by the numeral 10 in FIG. 1. An electrode constructed in accordance with the present invention is designated generally by the numeral 15 in FIGS. 2 and 3. The electrode 15 includes a frame 20 having a first opening 21, which is defined by a peripheral edge 23 and an adjacent second opening 22 which is defined by a peripheral edge 24. The frame has a border defined by a peripheral edge 25. Located in predetermined locations along the peripheral edge 25 of the frame 20 is a plurality of individual bores 26.

Mounted in occluding relation relative to the respective openings 21 and 22 are first and second carbon plastic sheets, or inserts, 30 and 40, respectively. The first carbon plastic sheet 30, has a first surface 31, an opposite second surface 32, and a peripheral edge 33. Similarly, the second carbon plastic sheet 40, has a first surface 41, an opposite, second surface 42, and a peripheral edge 43. The peripheral edge 33 of the first carbon plastic sheet 30 is mounted or otherwise affixed on the peripheral edge 23 of the first opening 20. Similarly, the peripheral edge 43 of the second carbon plastic sheet 40 is fastened on the peripheral edge 24 of the second opening 22.

The individual carbon plastic sheets 30 and 40 may be mounted on or made integral with the plastic frame 20 by a technique such as thermal welding or the like. Further, plastic screens or meshes 50 and 55 may be mounted on the frame 20 along the peripheral edges 23 and 24 of the opening 21 and 22 in covering relation to the surfaces 31 and 41 of the carbon plastic sheets 30 and 40, respectively.

The screens 50 and 55 are optional components of an electrode constructed in accordance with the teachings of present invention, yet it is possible that plastic screens may be mounted on both sides of a carbon plastic sheet. In a functioning battery, plastic screens help ensure uniform spacing between adjacent components of the battery. As should be understood, a screen or mesh has nodes 56 at points where horizontal and vertical members of the mesh meet (see FIG. 2). For some applications, for example, the nodes have a thickness of about 0.025 inches. Thus, with a screen in place a spacing of about the thickness of the nodes is maintained between adjacent components. While not shown, it is possible for the nodes of a screen to contact adjacent components in a battery (see FIG. 4). Preferably, the plastic screens are made from polyethylene or polypropylene.

The carbon plastic sheets may include additional components. In particular, individual metal screens 60 and 65 may be imbedded in each of the carbon plastic sheets 30 and 40 respectively.

The carbon plastic sheets are, of course, conductive. Carbon plastic sheets are formed using conventional techniques by mixing plastic powder or pellets and carbon powder in a compounder. The carbon-plastic mixture is then extruded or compression molded into sheets which are generally about 0.025 inches thick.

As should be understood the carbon plastic sheets act as an electrically conductive substrate. While it is preferred that carbon plastic be used with the carbon coating of the present invention, substrates of other electrically conductive material may be suitable for use with the coating. For example, conductive electrodes could be formed from plastic pellets and metal powder or filings.

Figure 5:
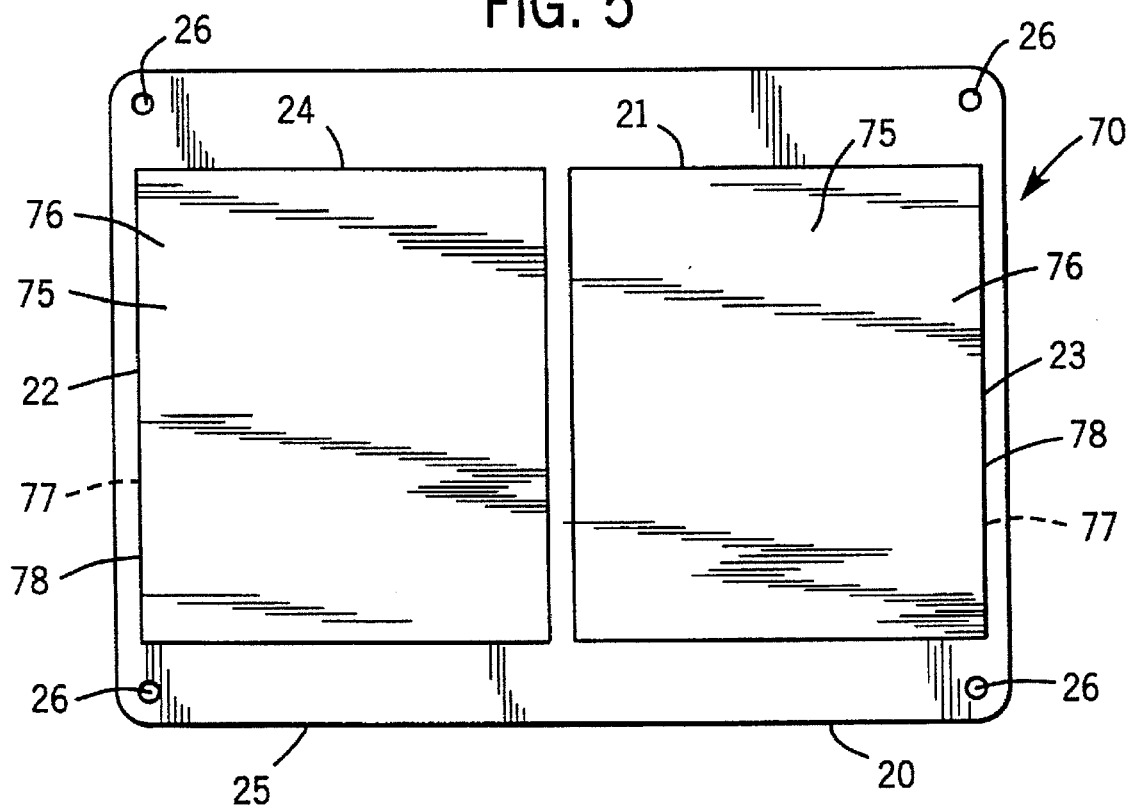
FIG. 5 is a side elevation view of a separator employed in the battery shown in FIG. 1.

The battery 10 also includes a predetermined number of frame-mounted separators which are designated generally by the number 70 in FIG. 5. A separator 70 includes the frame 20 having the openings 21 and 22. Mounted within the openings is a pair of microporous separators 75. The microporous separators 75 are preferably manufactured from a material such as silica-filled, high density polyethylene. Each of the microporous separators 75 has a first surface 76, an opposite second surface 77, and a peripheral edge 78. The peripheral edge 78 of any one of the microporous separators 75 may be welded to one of the peripheral edges 23 or 24 of one of the openings 21 or 22. The battery 10 consists of a stack of alternating components, that is, electrodes 15 and separators 70.

Figure 4:
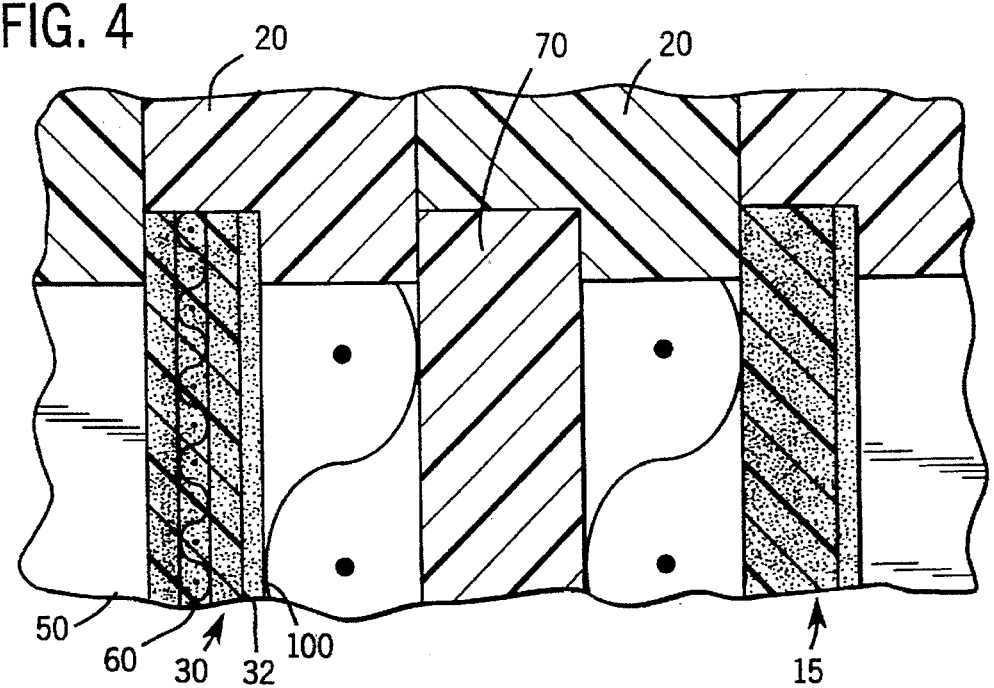
FIG. 4 is a schematic, greatly enlarged, fragmentary, cross-sectional view (not drawn to scale) of the battery shown in FIG. 1 and taken along the line 4—4 of FIG. 1.

As noted earlier, each of the electrodes 10 includes the carbon plastic sheets 30 and 40. Applied on the surfaces 32 and 42 of the carbon plastic sheets 30 and 40, before they are mounted in the openings 21 and 22, is a carbon coating or powder 100 (FIG. 4). The carbon coating or powder 100 includes a mixture of carbon particles of different sizes.

The carbon particles may be applied to the carbon plastic sheet surfaces 32 and 42 by means of an adhesive. It has been found that an adhesive under the tradename Eccocoat 258A, available from Emerson and Cuming, and another adhesive under the product number #W101894-3, available from Advanced Polymer Concepts, are suitable adhesives. The adhesive may be applied manually by rolling, brushing, or spraying it on to the surface of the carbon plastic sheets 30 and 40. Each carbon plastic sheet is then placed in a tray filled with carbon particles so that a layer of carbon particles, approximately 0.003 of an inch thick, is formed on one surface of the each carbon plastic sheet 30 and 40. The carbon could also be sprinkled or sprayed on each carbon plastic sheet. The carbon covered plastic sheets are then placed in a heated press and the carbon particles are hot-pressed into the surfaces of the plastic sheets. The layer of carbon particles is pressed into each carbon plastic sheet so that a layer of carbon of about 0.002 of an inch thick is formed.

After the carbon is applied the carbon plastic sheets are heated to their melting point or temperature. The melting point or temperature is dependent upon the ratio of carbon to plastic used to form the electrode. For electrodes formed from carbon filled, high density polyethylene, melting points or temperatures are in the range of about 325° F. to 375° F.

As noted earlier, carbon coatings or powders having high surface area particles have been employed on electrodes heretofore and were expected to yield very high electrochemical surface areas. The results of such use have, however, been disappointing. For example, the application of a carbon coating or powder with particles having extremely high surface areas resulted in very low electrochemical surface areas when applied to electrodes for use as bromine electrodes, i.e., electrodes upon which a bromine-bromide reaction takes place.

Further, it has been discovered that the electrochemical surface area of a bromine electrode depends not only on the surface area of the carbon particles, but also upon the carbon particle size distribution. As can be seen by reference to Table 1, both the mean particle size, and the number of small particles affects the electrochemical surface area of a bromine electrode. As should be understood, the BET surface area of the carbon particles is the surface area in square meters per gram as measured by the nitrogen intrusion method of measuring surface area discovered by Brunauer, Emmett, and Teller, known as "BET." (Brunauer, Emmett, and Teller. American Chemical Society, Vol. 60, p. 309 (1938)). The electrochemical surface area is that electrode surface area which is electrochemically accessible to battery electrolyte. This area is measured by using a cyclic voltammetric method for measuring the electrical double-layer capacitance of the electrode and then using a conversion factor of 20 microfarads of capacitance per $cm^2$ of electrochemical surface area (Gagaon, Journal of the Electrochemical Society, Vol. 122, p. 521 (1975)).

TABLE 1

| | Electrochemical Surface Area For Various Types of Carbon | | | | |
|---|---|---|---|---|---|
| Carbon Type | BET Surface Area ($m^2/g$) | Mean Particle Size (Micron) | Particle Size 75% ≧ (Micron) | Particle Size 90% ≧ (Micron) | Electrochemical Surface Area ($cm^2/cm^2$) |
| #1 | 890 | 37.33 | 23.27 | 9.80 | 1438 |
| #2 | 1100 | 58.18 | 32.61 | 10.29 | 2000 |
| #3 | 1850 | 28.98 | 23.09 | 18.69 | 3531 |
| #4 | 790 | 61.26 | 48.77 | 25.28 | 5031 |
| #5 | 970 | 119.2 | 103.8 | 70.54 | 10,530 |

As shown above, Table 1 illustrates a comparison of five different types of carbon powder. As indicated by Table 1, the BET surface area of the carbon particles appears to be an important factor in producing a coating of desired characteristics. For example, the particles in carbon powder type #3 have a very high BET surface area and yield a relatively high electrochemical surface area, even though the mean particle size for the carbon powder type #3 is smaller than any of the other carbon powders.

Another factor which appears to be important in producing a carbon coating or powder of desired characteristics is the mean particle size. For example, the carbon powder type #5 has the largest mean particle size of all the carbon powder types tested, and also yielded a coating with the highest electrochemical surface area. Further, carbon powder type #2, which has a mean particle size similar to carbon powder type #4, and a larger BET surface area than carbon powder type #4, yielded a significantly lower electrochemical surface area than carbon powder type #4. This reveals that the mean particle size and BET surface areas are not the most important factors in obtaining a coating or powder which when applied to an electrode yields a large electrochemical surface.

It has been discovered, therefore, that the most important factor in obtaining a large electrochemical surface area for the electrode appears to be the carbon particle size distribution. In particular, an important factor in obtaining a large electrochemical surface area for the electrode appears to be the number of small particles.

From the results in Table 1, it has been discovered that a carbon powder or coating for an electrode should contain carbon particles having a BET surface area of greater than about 700 m$^2$/g; a mean particle size greater than about 30 microns, and preferably greater than about 50 microns; and the particle distribution, by volume, should be in a range such that about 90 percent of the particles are greater than 10 microns in size, and preferably greater than 20 microns in size. For optimal performance it has been found that the particles in the carbon coating 100 should have a mean size greater than about 100 microns and about 90 percent, by volume, of the particles should be greater than about 70 microns in size (see Table 1, carbon powder type #5).

While it has been found that relatively large particle size is an important characteristic of carbon powders useful for creating a carbon coating in accordance with the teachings of the present invention, there is a practical upper limit of particle size. In general, powders useful for creating carbon powders should not contain individual particles having a size greater than about 0.010 inches. Typically, batteries in which the carbon coating of the present invention is used have a gap of about 0.025 inches between adjacent components. It has been found that when carbon powders containing individual carbon particles greater than 0.010 inches in size are used, that the resulting coating has high points or spots which restrict the flow of electrolyte through the battery or which may contact or penetrate adjacent components.

Carbon powder having the desired characteristics described above and suitable for use as a coating for an electrode may be obtained by appropriately sifting commercially available carbon powders by conventional methods. It has been found that carbon powder available from the Calgon Carbon Corporation under the designation TOGLF 80X325 is a suitable carbon powder which may be used to obtain a coating of the present invention.

Thus, the present invention provides an improved carbon plastic electrode and a carbon coating therefore. The present invention further provides an electrode wherein a bromine-bromide reaction can occur at a relatively faster rate. The present invention further provides a coating, which when applied to an electrode, produces a very high electrochemical surface area. Lastly, the present invention provides a coating which improves the efficiency and cycle life of a battery which incorporates same.

Although the present invention has been herein shown and described in what is conceived to be the most practical and preferred embodiment, it is recognized that departures may be made therefrom within the scope of the invention which is not to be limited to the illustrative details disclosed. In particular, it should be understood that the geometric configuration of the frame and the number of openings or apertures therein may be varied. As should be apparent, one or more opening of various shapes and sizes could be formed in a frame of various size and shape. Further, matching carbon plastic sheets or inserts could be mounted, one within each opening, on the frame to form an electrode. In addition, while frame-mounted electrodes have been discussed, it is possible that other methods of placing or mounting electrodes in a battery or battery case may be employed. In particular, it might be convenient to mount electrodes within slots formed in a plastic case or container.

What we claim is:

1. An electrode comprising:
   a substrate of electrically conductive material formed of a plastic material containing electrically conductive particles, the substrate of electrically conductive material having a first surface and an opposite second surface; and
   a carbon coating applied to the first surface of the substrate, the carbon coating including carbon particles of different sizes, and wherein the particles have a BET surface area of greater than about 700 m$^2$/g, and a mean size of greater than about 100 microns; and wherein the particles are distributed within the carbon coating so that about 90 percent, by volume, of the particles are greater than about 70 microns in size.

2. An electrode as claimed in claim 1, and wherein the particles in the carbon coating have a BET surface area greater than about 1000 m$^2$/g, and the mean particle size of the particles is greater than about 100 microns; and wherein the particles are distributed within the carbon coating so that about 90 percent, by volume, of the particles are greater than about 70 microns in size.

3. An electrode comprising:
   A nonconductive frame defining an opening;
   a conductive carbon plastic sheet having a first surface, an opposite second surface, and a peripheral edge, and wherein the peripheral edge of the carbon plastic sheet is mounted on the frame and disposed in occluding relation relative to the opening; and
   a carbon coating applied to at least one surface of the carbon plastic sheet, the carbon coating including carbon particles of different sizes, and wherein the particles have a BET surface area of greater than about 700 m$^2$/g and a mean size of greater than about 100 microns; and wherein the particles are distributed within the carbon coating so that about 90 percent, by volume, of the particles are greater than about 70 microns in size.

4. An electrode as claimed in claim 3, and wherein the particles in the carbon coating have a BET surface area greater than about 1000 m$^2$/g, and the mean particle size of the particles is greater than about 100 microns; and wherein the particles are distributed within the carbon coating so that about 90 percent, by volume, of the particles are greater than about 70 microns in size.

5. An electrode as claimed in claim 4, wherein the frame defines a pair of openings which are defined by a peripheral edge; and the electrode further comprises a pair of carbon plastic sheets each having opposite first and second surfaces, wherein the individual sheets are mounted in occluding relation relative to the individual openings.

6. The electrode as claimed in claim 5, further comprising a first screen and a second screen, the first screen mounted on the peripheral edge of one of the pair of openings, and the second screen mounted on the peripheral edge of the other one of the pair of openings, and wherein each screen is mounted in side-by-side adjacent relation to one another and is mounted in covering relation to the first surface of each of the carbon plastic sheets.

7. A carbon powder for use as a coating on a carbon plastic substrate, the carbon powder comprising:
   carbon particles having a BET surface area of greater than about 700 m$^2$/g and a mean particle size greater than about 100 microns; and wherein the carbon particles are distributed in the carbon power so that about 90 percent of the particles are greater than about 70 microns in size.

8. A carbon powder for use as a coating on a carbon plastic substrate, the carbon powder comprising:

carbon particles having a BET surface area of greater than about 1000 $m^2/g$ and a mean particle size greater than about 100 microns, and wherein the carbon particles are distributed in the carbon powder so that 90 percent of the particles are greater than about 70 microns in size.

9. An electrode comprising:

a non conductive frame having a first number of openings formed therein;

a plurality of carbon plastic sheets each having a first surface, an opposite second surface, and a peripheral edge and wherein the peripheral edge of each carbon plastic sheet is mounted on the frame and disposed in occluding relation relative to one of the first number of openings;

a carbon coating applied to at least one surface of each of the carbon plastic sheets, and wherein the carbon coating includes carbon particles of different sizes, and wherein the particles have a BET surface area of greater than about 700 $m^2/g$, and a mean size of greater than about 100 microns; and wherein the particles are distributed within the carbon coating so that about 90 percent, by volume, of the particles are greater than about 70 microns in size.

10. An electrode as claimed in claim 9, and wherein the particles in the carbon coating have a BET surface area greater than about 1000 $m^2/g$, and the mean particle size of the particles is greater than about 100 microns; and wherein the particles are distributed within the carbon coating so that about 90 percent, by volume, of the particles are greater than about 70 microns in size.

11. A carbon powder for use as a coating on a battery electrode, the carbon powder comprising:

carbon particles having a BET surface area of greater than about 700 $m^2/g$ and a mean particle size greater than about 70 microns, and wherein the carbon particles are distributed in the carbon powder so that 90 percent of the particles are greater than about 70 microns in size.

* * * * *